T. J. Flanders,
Clapboard Machine.
N° 943.    Patented Sep. 25, 1838.
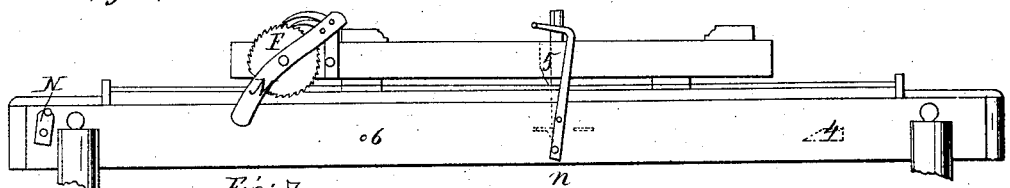
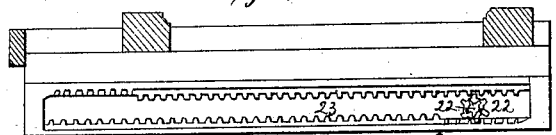
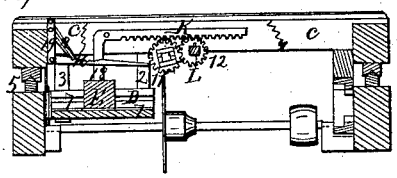
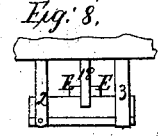
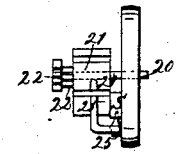
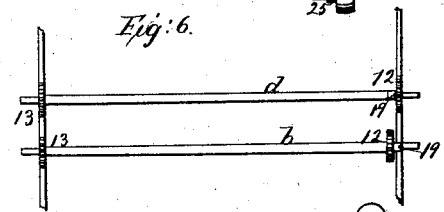
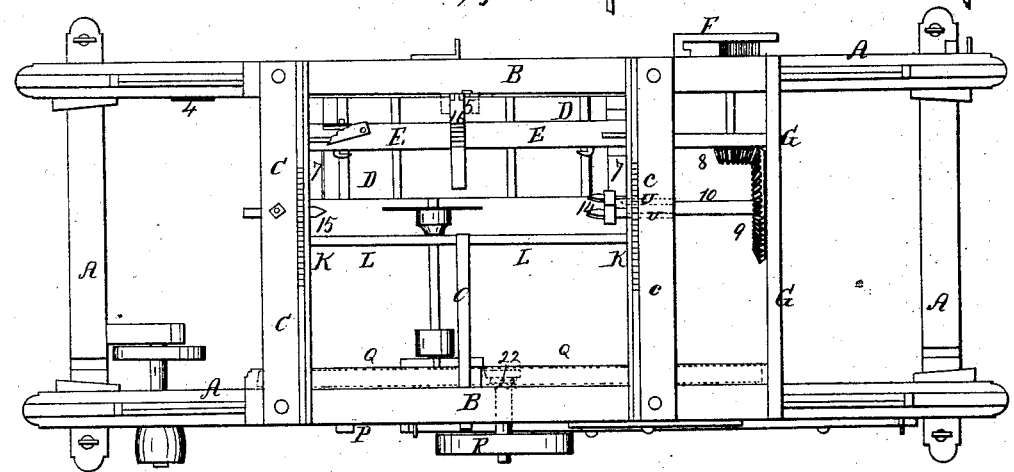
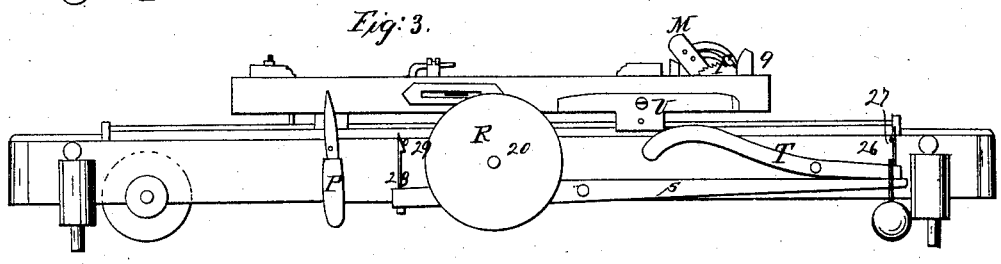

UNITED STATES PATENT OFFICE.

THOS. J. FLANDERS, OF BRADFORD, NEW HAMPSHIRE.

MACHINE FOR SAWING SHINGLES AND CLAPBOARDS.

Specification of Letters Patent No. 943, dated September 25, 1838.

*To all whom it may concern:*

Be it known that I, THOMAS J. FLANDERS, of Bradford, in the county of Merrimack and State of New Hampshire, have invented a new and useful Improvement in Machines for sawing Clapboards and Shingles; and I do hereby declare that the following is a full and exact description thereof, reference being had to the drawings accompanying and making part of this specification.

This machine is composed of the combination and arrangement of old and well known principles, arranged and combined in my own peculiar manner, to produce the result of sawing clapboards and shingles, and giving to them a proper thickness and taper and doing this while the log, plank or bolt from which the clapboard or shingle is cut is made to pass forward and back in contact with the saw, instead of only one way as in machines heretofore known and used for this purpose.

A, A, A, A, Figure 1, represent the frame of the machine, made in the usual manner of machines for this purpose.

B, B, the sides of the frame of the carriage.

C, C, a transverse piece forming one end of the carriage, attached to which is the stationary center. c, c, another transverse piece, placed about one fourth of the length of the carriage from the opposite end, to which is attached the revolving center.

D, D, Figs. 1 and 4 the rest or platform upon which the bolt for shingles or planks for clapboards is placed and confined during the operation of sawing. This platform is placed on the front side of the carriage, at a convenient distance below the two transverse pieces, and is of a length equal to the distance between them, and in width extending from the inside of the front piece of the frame of the carriage to the saw which is near the center of the machine. In sawing shingles it remains stationary, in its connection with the carriage, but in sawing clapboards from the plank is made to have a vibratory motion. The edge nearest the saw is supported by pivots 1 Fig. 8 passing through a metallic stand 2, Figs. 4 and 8 at each end extending downward from the transverse pieces the requsite distance. Similar metallic stands 3 Figs. 4 and 8 extend downward from the transverse pieces near the front side with their ends bent inward at right angles supporting the front edge of the platform in its level position or in that position in which the thick edge of the clapboard is sawed from the lower side of the plank. After the plank has passed the saw in the operation of cutting the before mentioned clapboard, the front side is elevated by passing over an inclined plane 4 Figs. 1 and 2 attached to the frame of the machine and held in this position during the operation of sawing the clapboard with its thick edge from the top of the plank, by a spring catch 5, Figs. 1, 2 and 4 attached to the frame of the carriage. When this operation is performed, the spring catch comes in contact with a pin 6 Fig. 2 on the frame of the machine which releases the platform from it, and the platform falls to its level position by its own gravity. On the platform at each end, are attached two transverse pieces 7 Figs. 1 and 4 with grooves by which the movable gage is guided.

E, E, Figs. 1, 4 and 8, a movable gage to which the plank or bolt is attached during the operation of sawing either clapboards or shingles by means of dogs adjusted to suit the length of the plank or bolt in the usual manner.

F, Figs. 1, 2 and 3, a ratchet wheel placed on the front side piece of the carriage and attached to a transverse shaft, running in suitable boxes. On the opposite end of said shaft is a small bevel pinion 8, Fig. 1, connected with and communicating motion to a bevel wheel 9, Figs. 1 and 3, about four times its size which wheel is connected with the horizontal shaft or revolving center 10, Fig. 1, near its outer end and running in suitable boxes, represented by the dotted lines v, Fig. 1, connected to transverse pieces c. Near that end of the shaft to which the dog is attached, and on the inside of the transverse piece c, is a pinion 11, Fig. 4, which connects with another pinion 12, Fig. 4, on the one end of the longitudinal slide shaft L, Figs. 1 and 4, which last mentioned pinion communicates with the rack k, Fig. 4. On the other end of said slide shaft is also another pinion as represented at 13, Fig. 6, connecting with rack K, Fig. 4, for the purpose of moving the gage E, E, backward and forward.

G, G, a third transverse piece forming one end of the carriage and near the center of which is the bearing of one end of the shaft of bevel wheel 9, while the other has for its bearing a cleat attached to the under side of the transverse piece c, c, as before mentioned, which shaft constitutes a revolving center. On the inner end of this shaft is attached the dog 14, Fig. 1, when required to saw clapboards from the log, which sustains one end of the log, while the other is sustained by a stationary center 15, Fig. 1, attached to transverse piece C, which stationary and revolving centers are in a line with and at a suitable distance above the saw.

H, Fig. 4, a vertical stand attached to the inside of the front side piece of the carriage, to which is connected by means of a joint, at the lower end a movable arm 16, Figs. 1 and 4, which rests upon the bolt or plank for the purpose of holding them more firmly during the process of sawing, and held in that position by diagonal braces or pawls, 17, Fig. 4, extending from the top of the stand to notches cut in the top of said arm.

K, k, Figs. 1 and 4, two small movable racks inserted in the inside of the two transverse pieces C C, c c, to which are attached arms 18 Figs. 4 and 8 leading into a groove in the ends of the movable gage, thereby forming a connection with it, as shown at 18, Fig. 8.

L, Figs. 1 and 4, a longitudinal slide shaft directly back of the saw revolving in suitable boxes attached to the transverse pieces C C, c c, and is the connecting shaft of the two pinions 12 and 13, Fig. 6, above mentioned. In the process of sawing shingles, and as represented at b, Fig. 6, the pinion on that end of shaft nearest the revolving center is placed farther upon the shaft by drawing the pin which confines it in its outward position, which is necessary for sawing clapboards, moving it the thickness of it farther on, and inserting the pin 19, Fig. 6, on the outer side necessarily shortening the distance between the two by which they are made to act on only one of the racks K, k, Figs. 1 and 4, at a time, so that the movable gage with the bolt confined to it, is made to present a diagonal position equal to the required taper of the shingle and will present the same end of the shingle to the first action of the saw at each successive operation.

M, Fig. 2, a lever concentric with the ratchet wheel F, at the upper end of which are pawls working into the ratchet wheel and by which it is moved.

N, n, Fig. 2, stands attached to the outside of the frame of the machine, one near the end, and the other near the center, for the purpose of giving motion to the lever M by acting alternately on the top and bottom of it.

O, Fig. 1, an arm connected at one end with the longitudinal slide shaft and the other extending through the back side piece of the carriage. By the action of the stand P, Figs. 1 and 3, on this end of the arm, the longitudinal slide shaft is made to move, thereby performing the operation of connecting and disconnecting the pinions 12 and 13 with the racks K, k, in the operation of sawing shingles as above mentioned.

P, Figs. 1 and 3, the above mentioned stand, turning on a pivot near its center, the lower end of which is made sufficiently heavy to keep it in an upright position and move the arm O.

Q, Figs. 1 and 7, two double racks united at each end, and attached to the inside of the back side piece of the frame of the carriage extending downward to be acted upon by the pinions on the shaft of pulley R.

R, a pulley placed near the center of the back side piece of the machine attached to a transverse shaft 20, Figs. 1, 3 and 5 running in a movable box 21 Fig. 5. On the opposite end of said shaft are two small pinions 22, Figs. 5 and 7, the inner or smaller of which connects with and gives motion to the long rack 23 Fig. 7 for the purpose of moving the carriage in the operation of sawing, and the outer or larger connects with and gives motion to the short rack 24 Fig. 7 for the purpose of accelerating the motion after the saw has ceased cutting and the bolt or plank is passing the saw prior to the next operation. These racks are so arranged that when the small pinion has ceased operating on the longer, the larger immediately connects with the shorter, thus forming a continuous rack.

S, a longitudinal lever on the back side piece of the machine with its fulcrum near the pulley R. Near that end of this lever adjoining the pulley, extending down to the under side of the frame and up through the frame, is a connecting rod, represented at 25, Fig. 5, which is attached to the movable box by which means the two small pinions are made to work in either rack as may be necessary for the purpose of moving the carriage backward and forward while the drum is revolving in one direction.

T, Fig. 3, a bent lever on the back side piece of the frame of the machine near one end, and directly over the lever S. At one end of this lever extending upward is a spring clutch 26, Fig. 3, which connects with a small pin 27 for the purpose of holding it in its place when required, this end of the lever is much heavier than the other (represented in the drawing by a weight) so that when the catch is released from the pin this end of the lever falls with sufficient force on the end of lever S, to cause it to raise the movable box attached to it so that the pinions work in the upper racks. The movable box is held in this position by a spring catch 28 on this end of lever S, which connects with a pin 29 on the frame of the carriage.

U, Fig. 3, a gage attached to the back side piece of the frame of the carriage which as the carriage recedes or advances releases the spring catches from their hold on the pins above mentioned for the purpose of causing the movable box to raise or lower as already described. This gage is adjusted in length to suit the length of the material to be sawed.

In sawing clapboards from the log the platform and slide shaft are removed, and the log supported on the centers. The revolving motion is caused by the pawls on the ratchet wheel as before described.

In the accompanying drawings Fig. 1, represents a horizontal projection. Fig. 2 a front vertical projection. Fig. 3, a back vertical projection. Fig. 4, a transverse section through the carriage exhibiting the relative position of the racks and pinions and the platform on which the bolt or plank is placed. Fig. 5, exhibits the method of uniting the movable box and pinions with the lever s. Fig. 6, the two positions of the movable pinion on the slide shaft L. a, the position in which it is used for sawing clapboards from plank. b, that for sawing shingles when it is necessary to connect only one pinion with the racks at a time. Fig. 7, a vertical projection of the double racks. Fig. 8, an end view of the carriage showing the manner in which it is sustained and the manner of connecting the arm of the racks with the movable gage.

What I claim as my invention and desire to secure by Letters Patent, is,

1. The combination of two double racks attached at both ends, and pinions for the purposes and in the manner herein set forth.

2. The peculiar mode of combining the racks K k with the pinions 12 and 13 by the longitudinal shaft L, so as to give motion to both racks at a time in the operation of sawing clapboards from the plank and to only one in the operation of sawing shingles, thereby giving to the clapboard its proper thickness, and to the shingle its proper thickness and taper in the manner before described.

THOS. J. FLANDERS.

Witnesses:
 JOHN MORRISON,
 JOHN W. HUBBARD.